(12) United States Patent
Weiszbrod (10) Patent No.: US 9,957,730 B2
(45) Date of Patent: May 1, 2018

(54) APPARATUS AND METHOD FOR ASSEMBLING FENCE PANELS

(71) Applicant: David A. Weiszbrod, Oklahoma City, OK (US)

(72) Inventor: David A. Weiszbrod, Oklahoma City, OK (US)

( * ) Notice: Subject to any disclaimer, the term of this patent is extended or adjusted under 35 U.S.C. 154(b) by 709 days.

(21) Appl. No.: 14/589,970

(22) Filed: Jan. 5, 2015

(65) Prior Publication Data
US 2015/0191923 A1 Jul. 9, 2015

Related U.S. Application Data

(60) Provisional application No. 61/923,743, filed on Jan. 5, 2014.

(51) Int. Cl.
*E04G 21/16* (2006.01)
*E04H 17/26* (2006.01)
*B23P 19/04* (2006.01)
*E04H 17/14* (2006.01)

(52) U.S. Cl.
CPC ............ *E04H 17/26* (2013.01); *B23P 19/04* (2013.01); *E04H 17/1426* (2013.01); *Y10T 29/49829* (2015.01)

(58) Field of Classification Search
CPC ..... E04H 17/26; E04H 17/14; E04H 17/1426; B23P 19/04; Y10T 29/49829; Y10T 29/5191; B27F 7/003
USPC ........................................................... 29/772
See application file for complete search history.

(56) References Cited

U.S. PATENT DOCUMENTS

| | | | | |
|---|---|---|---|---|
| 3,763,547 A | * | 10/1973 | Blakeslee | B27M 3/0073 227/45 |
| 4,403,388 A | * | 9/1983 | Belcher | B27M 3/0073 227/40 |
| 4,467,951 A | * | 8/1984 | Pagano | B27M 3/0073 227/100 |
| 4,489,874 A | * | 12/1984 | Worst | B27M 3/0073 144/136.6 |
| 4,562,949 A | | 1/1986 | Knoth | |
| 4,708,276 A | * | 11/1987 | Knoth | B23D 47/10 144/2.1 |
| 6,058,601 A | * | 5/2000 | DeKoning | B27F 7/003 198/456 |

(Continued)

*Primary Examiner* — Christopher M Koehler
*Assistant Examiner* — Henry Hong
(74) *Attorney, Agent, or Firm* — Sean O'Connell, PLLC (57) ABSTRACT

A machine for assembling fence panels. The machine includes rail supports, a plurality of rail transport assemblies, a picket hopper for storing pickets substantially perpendicular to the rail supports, a picket transport assembly, a picket spacing assembly, a picket skewing assembly, and nailing guns. The rail transport assemblies include a conveyor for moving rails longitudinally to an assembly position. The picket transport assembly uses a conveyor to move pickets from the hopper to the assembly position, delivering the pickets at an acute delivery angle. The picket spacing assembly increases the delivery angle for a picket to increase spacing between pickets. The picket skewing assembly pushes an end of a picket closer to a previous picket to adjust for spacing between warped pickets. The nailing guns secure a picket at the assembly position to the rails. A machine controller is used to automatically operate the components of the machine.

8 Claims, 9 Drawing Sheets

(56) References Cited

U.S. PATENT DOCUMENTS

| | | | |
|---|---|---|---|
| 6,993,817 B1 * | 2/2006 | Swinger | E04H 17/00 256/29 |
| 7,845,486 B2 * | 12/2010 | Spencer | B65G 47/71 198/427 |
| 7,896,211 B2 * | 3/2011 | Tu | B27M 3/0073 198/604 |

* cited by examiner

APPARATUS AND METHOD FOR ASSEMBLING FENCE PANELS

FIELD OF THE INVENTION

The present invention relates to machines for use in construction and more particularly to machines for assembling fence panels.

BACKGROUND OF THE INVENTION

Assembly of fence panels in a quick and efficient manner is desirable. Fence panels have been constructed both by hand and with the aid of machines. Preferred construction includes uniform spacing between pickets, consistent nailing, and panels that have pickets flush with rails at each end of the panel. The present invention provides a machine to assemble fence panels with the desired characteristics.

SUMMARY OF THE INVENTION

The present invention is directed to a machine for assembling fence panels. The machine comprises a plurality of rail supports, a plurality of rail transport assemblies, a picket hopper adapted to support a plurality of pickets substantially perpendicular to the plurality of rail supports, a picket transport assembly adapted to move a picket from the hopper to the assembly position, a drive shaft, a picket spacing assembly, a picket skewing assembly, and a picket nailing assembly. The plurality of rail supports are positioned parallel to each other, with each rail support adapted to support at least one rail. The plurality of rail transport assemblies comprise one rail transport assembly disposed for each rail support, and each rail transport assembly comprises a rail conveyor adapted to move a rail in a longitudinal direction to an assembly position, a push bar secured to each rail conveyor, and a centering assembly positioned proximate the assembly position and adapted to position a lead end of a rail on the conveyor at the assembly position. The push bar is adapted to contact a rail in a rail support such that the rail is advanced along the conveyor and configured to center the rail on the conveyor. The centering assembly comprises a pair of centering arms movable between an open position and a closed position and a cylinder adapted to move the centering arms between the open position and the closed position. Wherein in the closed position the centering arms contact a rail on the conveyor such that the rail is positioned at the assembly position, and in the open position the centering arms do not contact a rail on the conveyor. The picket hopper comprises at least one ledge adapted to support the pickets in the hopper, at least one picket push bar, and a cylinder operatively connected to each picket push bar. The picket transport assembly comprises a picket conveyor and a conveyor guide positioned at an acute angle to the rail conveyors, the conveyor guide defining a delivery angle for a picket at the assembly position. The drive shaft is operatively connected to the rail conveyor and the picket conveyor. The picket spacing assembly comprises a spacing guide movable between an engaged position and a disengaged position, wherein in the engaged position the spacing guide increases the delivery angle for a picket at the assembly position, and a cylinder adapted to move the spacing guide between an engaged position and a disengaged position. The picket skewing assembly comprises a pinch roller movable between an engaged position and a disengaged position, wherein in the engaged position the pinch roller contacts a picket proximate the assembly position, and a skew cylinder adapted to move the pinch roller between the engaged position and the disengaged position. The nailing system comprises a plurality of nail guns disposed to secure a picket to a rail.

In an alternative embodiment the present invention is directed to a machine for assembling fence panels. The machine comprises a plurality of rail supports positioned parallel to each other and adapted to support at least one rail, a plurality of rail conveyors, a picket hopper adapted to support a plurality of pickets substantially perpendicular to the plurality of rail supports, a picket conveyor adapted to move a picket from the hopper to the assembly position, a picket spacing assembly, and a plurality of nail guns disposed to secure a picket to a rail at the assembly position. Wherein one rail conveyor is disposed for each rail support, each rail conveyor adapted to move a rail in a longitudinal direction to an assembly position. Wherein the picket conveyor is positioned relative to the rail conveyors at a delivery angle, and wherein the spacing assembly is adapted to adjust the delivery angle of the picket conveyor.

In yet another embodiment the present invention is directed to a method of assembling fence panels. The method comprises advancing a plurality of rails longitudinally along a plurality of parallel horizontal rail supports, stopping a leading edge of the rails at an assembly position, dispensing a plurality of pickets sequentially from a hopper above the rail supports, such that the pickets are perpendicular to the rail supports, aligning a top edge of each of the plurality of pickets, advancing the pickets toward the assembly position at an angle acute to the horizontal rail supports, stopping a first picket at the assembly position, securing the first picket to the plurality of rails, advancing the plurality of rails and the pickets along the rail supports, adjusting spacing between pickets to maintain substantially uniform picket spacing, skewing pickets to adjust for warped pickets, and securing subsequent pickets adjacent an already secured picket.

DETAILED DESCRIPTION OF THE INVENTION

Figure 1:
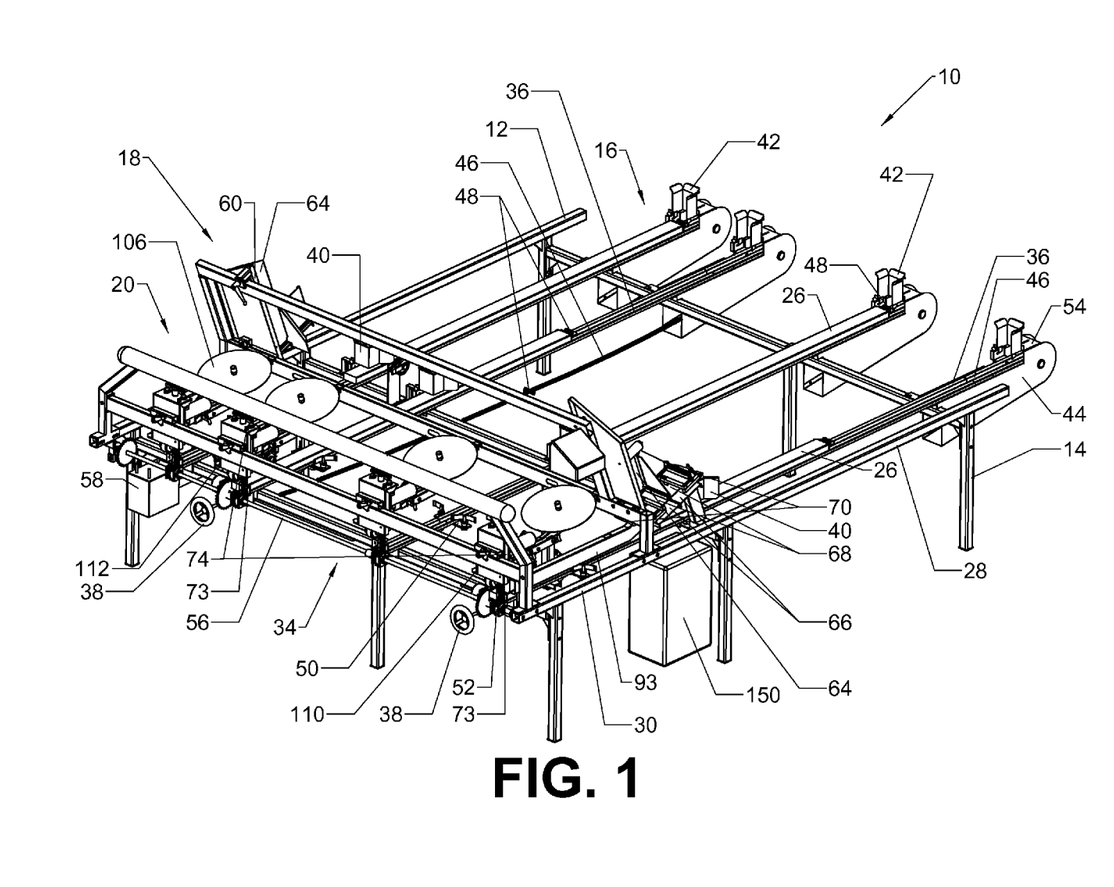
FIG. 1 is a front end perspective view of a machine for assembling fence panels built in accordance with the present invention.
Figure 1A:
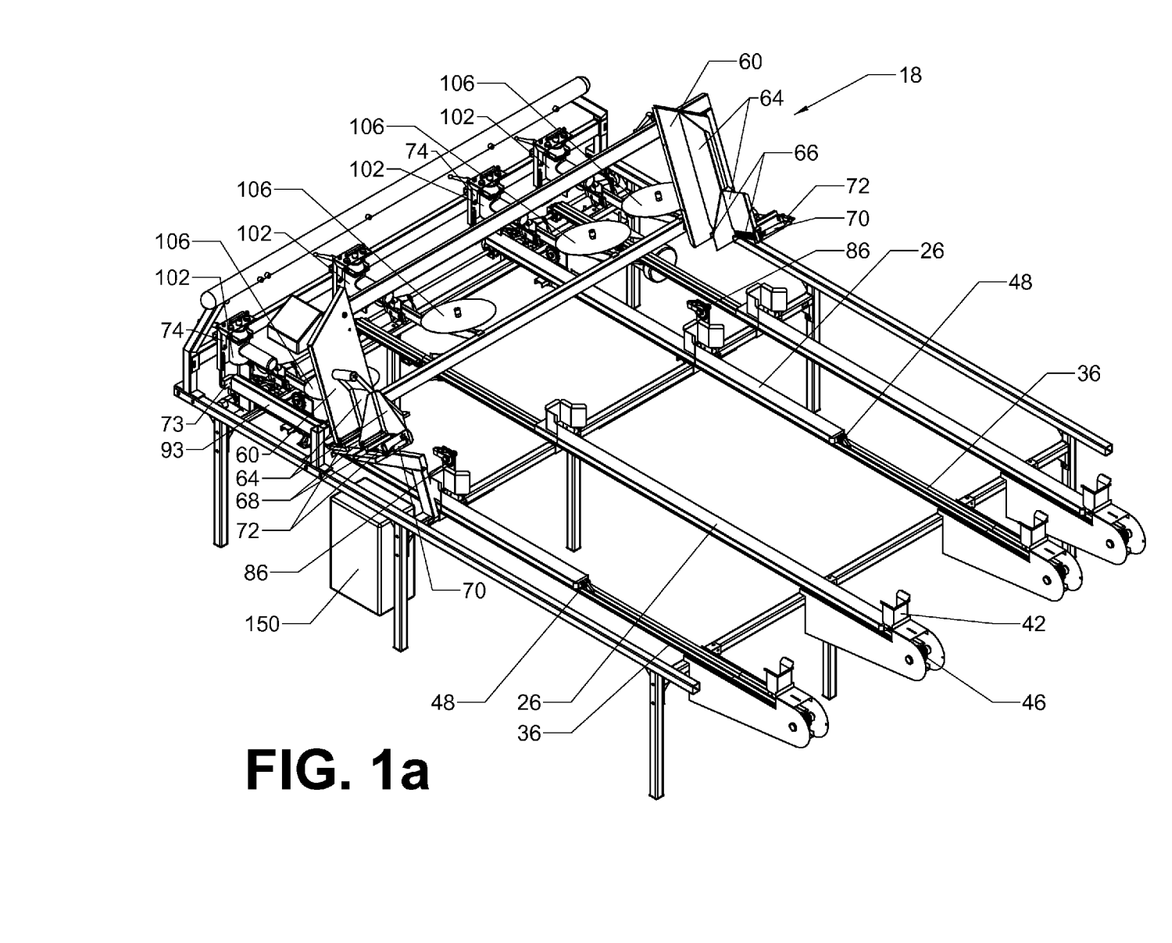
FIG. 1a is a back end perspective view of the machine of FIG. 1.

With reference now to the drawings in general and to FIGS. 1 and 1a in particular, there is shown therein a preferred embodiment for a machine for assembling fence panels constructed in accordance with the present invention. The machine, designated by reference number 10, comprises a frame 12 with a plurality of supporting legs 14. The frame 12 supports a machine controller 150 and the various systems of the machine 10: a rail system 16, a picket system 18, a nailing system 20, a spacing assembly 22 (shown in FIG. 2), and a skewing assembly 24 (shown in FIG. 2). The rail system 16 stores and moves rails 26 from a back end 28 of the machine 10 through the front end 30 of the machine. The picket system 18 stores pickets 32 (shown in FIG. 2) perpendicular to the rails 26 for delivery and securing to the rails at an assembly position 34 proximate the front end 30 of the machine 10. The nailing system 20 secures pickets 32 to the rails 26 at the assembly position 34. The spacing assembly 22 creates space between pickets as needed before pickets are secured to the rails. The skewing assembly 24 adjusts for warped picket materials by moving a top end or bottom end of a picket when needed. Coordination of all of the systems and the components of the machine 10 is automatically controlled and coordinated by the machine controller 150, resulting in an assembled fence panel that is moved off the front end 30 of the machine 10.

Continuing with FIGS. 1 and 1*a*, the rail system 16 stores and delivers rails 26 generally at the back end 28 of the machine 10. The frame 12 supports a plurality of rail supports 36, or platens. The plurality of rail supports 36 are longitudinal and arranged parallel to each other. The rail supports 36 are preferably U-shaped defining a channel and each supports a rail 26 (shown by way of example at different longitudinal positions) for construction of a fence panel. Preferably, the plurality of supports 36 will comprise four rail supports allowing for construction of a fence panel of traditional sizes having two, three, or four rails. Rail support adjusters 38 (shown on a first rail and a third rail) may be used to move rail supports 36 on the frame to adjust spacing between rails on an assembled panel. A front stack guide 40 and a rear stack guide 42 are disposed above each rail support 36, such that rails may be stacked (not shown) for use in subsequent panels.

With continued reference to FIGS. 1 and 1*a*, the rail system 16 further comprises a plurality of rail transport assemblies 44, with one rail transport assembly preferably disposed for each rail support 36. Each rail transport assembly 44 comprises a rail conveyor 46, a push bar 48, and a centering assembly 50. The rail conveyor 46 is preferably a continuous chain (shown in partial form to allow for illustration and viewing of other components) disposed along the length of the rail support 36 and may set in the channel of the rail support. The rail conveyor 46 is driven by a drive sprocket 52 proximate a front end 30 of the machine 10 and passes around an idler sprocket 54 at a back end 28 of the machine. A drive shaft 56 and an associated motor 58, disposed proximate the front end 30 of the machine 10, drives the drive sprocket 52 of each rail transport assembly 44.

The push bar 48 is secured to the rail conveyor 46. The push bar 48 functions to contact a rail 26 on the rail support 36 and move the rail along a length of the machine 10. One skilled in the art will appreciate the push bar 48 will contact a rail 26 at a bottom of a stack of rails (not shown) positioned between the front guide 40 and the rear guide 42. The centering assembly 50, to be described further below, functions to position a rail 26 on the rail support 36 as the rail approaches the assembly position 34.

As shown in FIGS. 1 and 1*a*, the picket system 18 of the machine 10 comprises a picket hopper 60 and a picket transport assembly 62 (shown in FIG. 2 and described further below). The hopper 60 is positioned perpendicular to and above the rail supports 36. The picket hopper 60 stores and dispenses pickets (not shown) for securing to the rails 26 when assembling a fence panel. In a preferred embodiment the hopper 60 may also store a stack (not shown) of "last pickets", to be used when a final picket of a panel is required to be of lesser width to ensure the picket is flush with ends of the rails. For storing pickets, the hopper 60 comprises a pair of end receptacles 64 each comprising at least one ledge 66 to support a stack of pickets. A picket push bar 68 is disposed adjacent each ledge 66. A cylinder 70 is used to actuate each push bar 68 so to dispense a picket from the bottom of the stack of pickets in the hopper 60. One or more lever arms 72 may be used to facilitate even dispensing of a picket from each end receptacle 64. In operation, the cylinders 70 are coordinated to dispense first a top end of the picket and then a bottom end of the picket from the hopper. After a picket is dispensed from the hopper 60, the picket transport assembly 62 serves to move pickets from a bottom of the hopper 60 to the assembly position 34. With rails 26 and a picket 32 at the assembly position 34, the nailing system 20 secures a picket to the rails by dispensing a nail through a picket into the rails.

Figure 2:
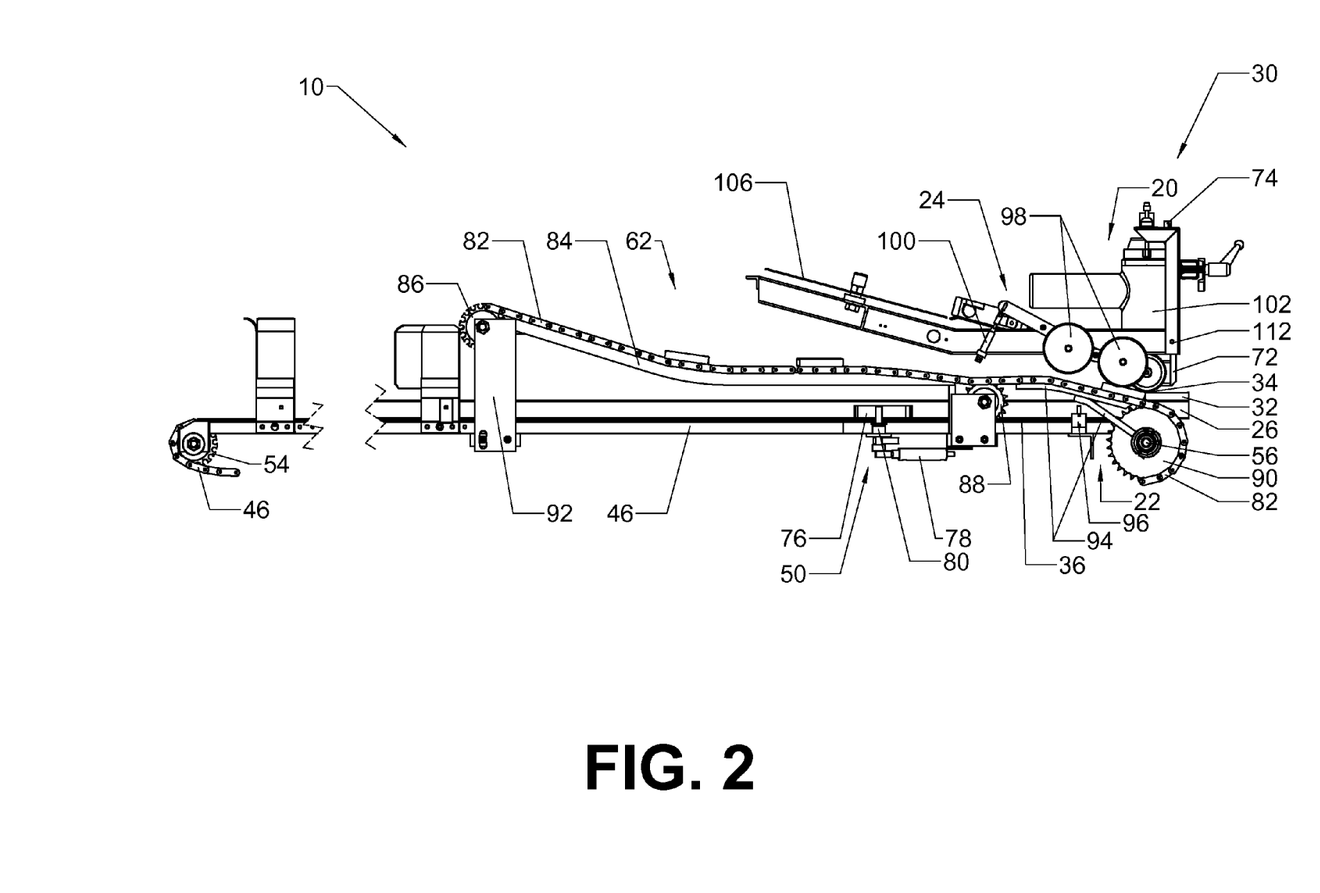
FIG. 2 is a partial section and side plan view of one of the rail supports proximate the front end of the fence panel assembly machine shown in FIG. 1.

With reference now to FIG. 2, shown therein is a plan side view of a partial section of the machine 10, showing components at the front end 30 of the machine in greater detail. The assembly position 34 is located at the front end 30 of the machine 10, defined by one or more stop bars 73. The stop bars 73 are preferably actuated by cylinders 74 lowering the stop bars just above the rail supports 36 so that the advancing pickets 32 are positioned for alignment and receipt of a first picket 32 to be secured to the rails. The stop bars 73 are retracted after a first picket 32 is secured to the rails 26 and the assembly process continues with the rails moving along the rail supports as pickets are secured to the rails.

Continuing with FIG. 2, the centering assembly 50 is shown supported on the rail support 36 proximate the assembly position 34 at the front end 30 of the machine 10. The centering assembly 50 is adapted to position a lead end of a rail 26 on the rail conveyor 46 when the rail approaches the assembly position 34. The centering assembly 50 as shown comprises a pair of centering arms 76 and a cylinder 78 positioned to operate the centering arms. One or more bearings 80 may be used to facilitate operation. The centering arms 76 are movable between an open position and a closed position. In the closed position the centering arms 76 close to contact a rail 26 on the conveyor 46 so that the rail is centered on the conveyor. In the open position the centering arms 76 do not contact the rail 26 on the conveyor 46. In operation the cylinder 78 will actuate to close the centering arms 76 when a rail 26 approaches the assembly position 34.

With continued reference to FIG. 2, the picket transport assembly 62 is shown and adapted to move pickets from beneath the hopper 60 to the assembly position 34. Preferably, the picket transport assembly 62 will necessarily be disposed only along the first rail support 36 and third rail support. The picket transport assembly 62 comprises a picket conveyor 82 and a conveyor guide 84 supporting the picket conveyor. The picket conveyor 82 comprises a continuous chain (shown in partial form to allow for illustration and viewing of other components) supported by idler sprockets 86 and 88 and driven by drive sprocket 90. Preferably, the drive sprocket 90 is driven by the drive shaft 56. More preferably, the drive sprocket 90 will be larger in diameter than the drive sprockets 52 (shown in FIG. 1) of the rail transport assemblies 44. One skilled in the art will appreciate that the picket conveyor 82 will consequently move faster than the rail conveyor 46 in an advantageous manner yet to be described. The idler sprocket 86 is secured to a bracket 92 and positioned below the picket hopper 60 and above the rail conveyor 46.

Figure 3:
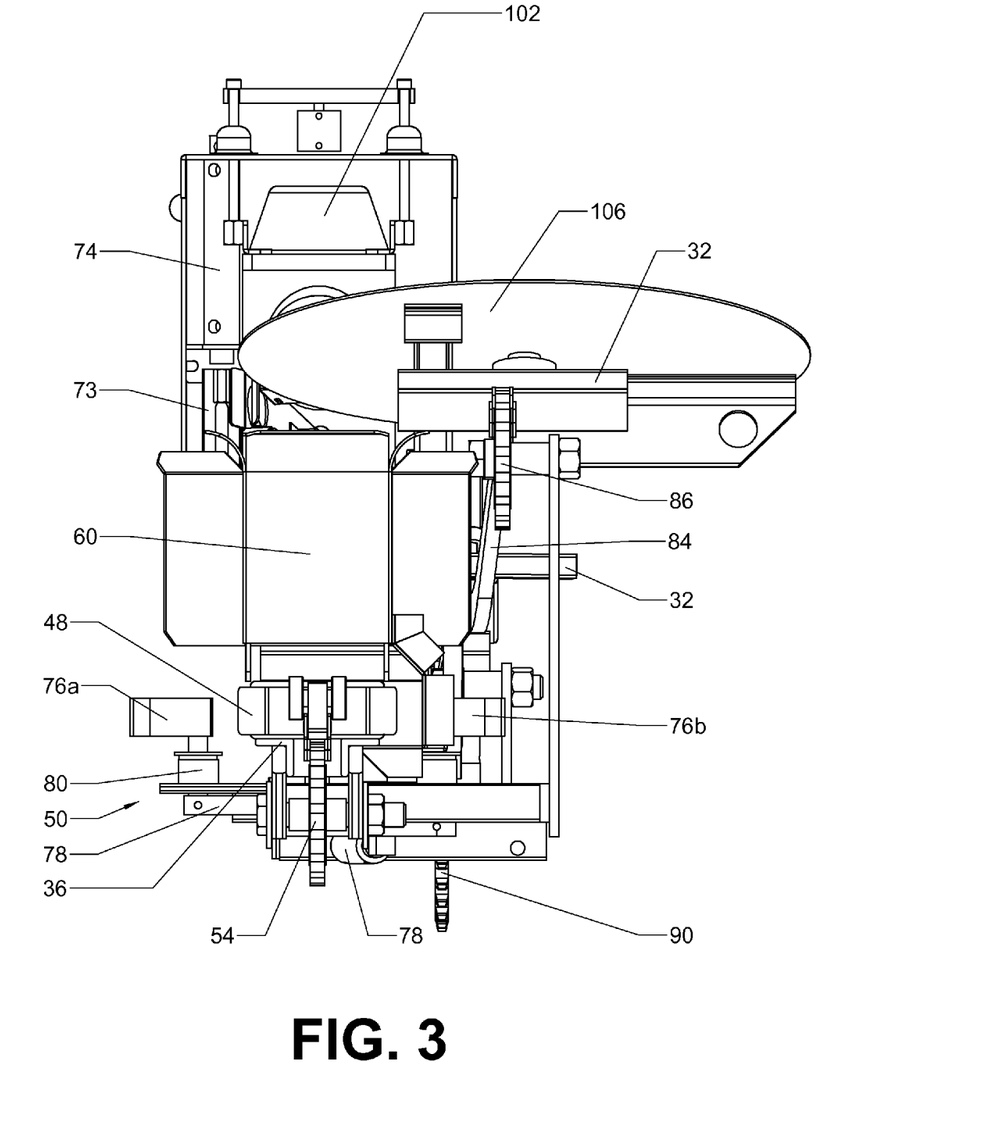
FIG. 3 is a partial back end view of a rail support and conveyor assemblies of the section shown in FIG. 2.
Figure 4:
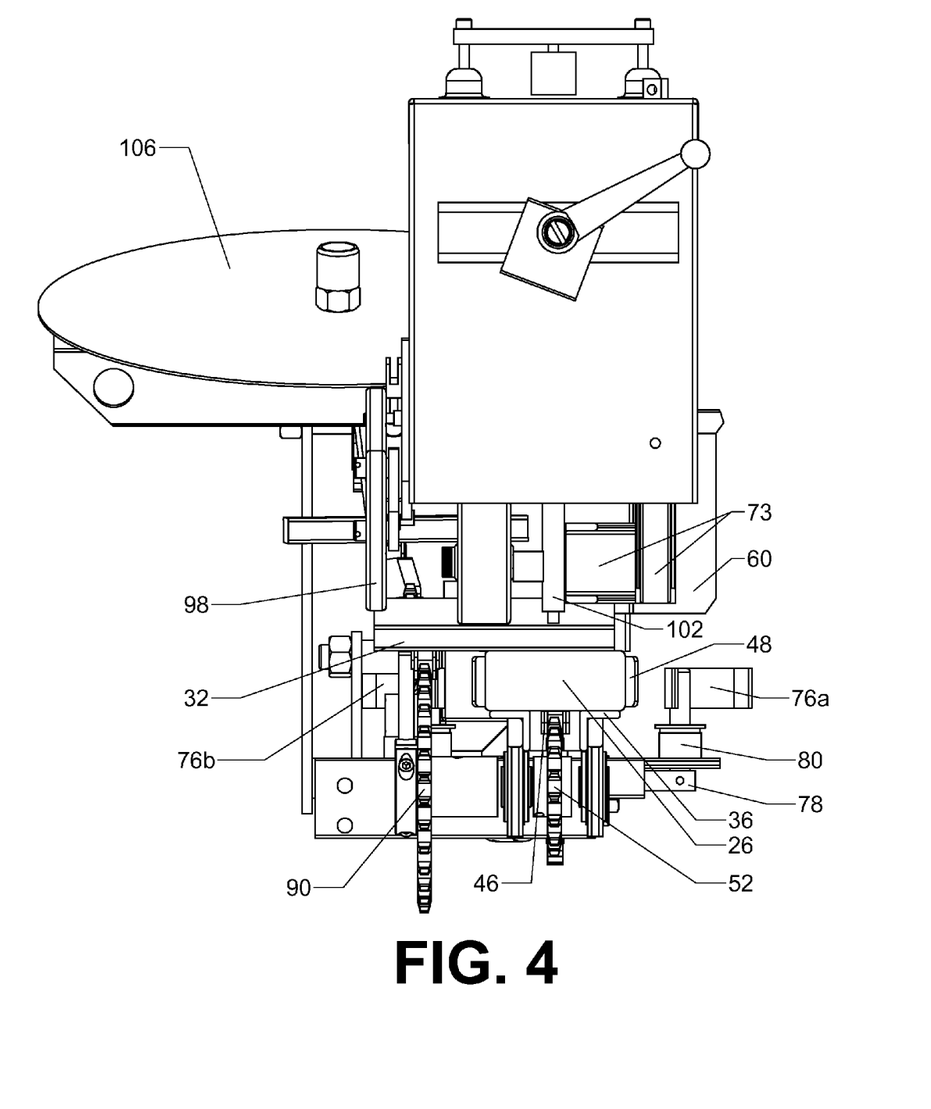
FIG. 4 is a partial front end view of a rail support and conveyor assemblies of the section shown in FIG. 2.

Preferably, the conveyor guide 84 is disposed between the idler sprocket 86 and the idler sprocket 88. More preferably, the conveyor guide 84 is disposed at a generally acute angle to the rail conveyor 46, adapted to move pickets downward from the hopper 60 to the assembly position. Additionally, the conveyor 82 and conveyor guide 84 are disposed at an angle lateral to the rail support 36. Preferably the conveyor guide 84 will be at a lateral angle of eighteen (18) degrees relative to the rail support 36. The lateral angle will be achieved by laterally offsetting the drive sprocket 90 and idler sprocket 86 (as shown in FIGS. 3 and 4 below). A picket alignment rail 93 (shown in FIGS. 1 and 1*a*) secured parallel to the rail supports 36 is used align a top end of the pickets as they are delivered to the assembly position 34. One skilled in the art will appreciate the conveyor 82 and conveyor guide 84 will move pickets toward the alignment rail 93 so that the top ends of all pickets are consistently aligned.

The picket spacing assembly 22 is disposed between the conveyor guide 84 and the assembly position 34. The spacing assembly 22 comprises a spacing guide 94 movable between a disengaged position and an engaged position. A lift cylinder 96 is disposed and adapted to move the spacing guide 94 between the disengaged position and the engaged position. In the disengaged position the spacing guide 94 allows the picket conveyor 82 to be disposed at an acute angle to the rail conveyor 46. In operation a picket will be moved by the picket conveyor 82 along the conveyor guide 84 and the spacing guide 94 to the assembly position 34. When spacing between assembled pickets is required, as determined in a manner yet to be described, the cylinder 96 is operated to move the spacing guide 94 to the engaged position. In the engaged position the spacing guide 94 will be at an angle slightly larger than the acute angle represented in the disengaged position, so that the picket conveyor 82 moves pickets 32 to the assembly position 34 at a greater angle of approach. Preferably, the acute angle for the disengaged position will be approximately six (6) degrees, while the angle for the engaged position will be approximately twelve (12) degrees. One skilled in the art will appreciate the larger angle will cause a leading edge of a presented picket now ready to be secured to contact a picket previously secured to a rail. As the presented picket is secured with a nail and the picket sets on the rail, a slight space is created between the pickets.

Continuing with FIG. 2, the machine 10 further comprises the picket skewing assembly 24 proximate the assembly position 34. The skewing assembly 24 is adapted to push picket 32 closer together prior to securing the pickets being secured to the rail 26. The skewing assembly 24 is operative to be used in the case of warped pickets that results in pickets not being square in the panel. The skewing assembly 24 comprises a pinch roller 98 and a skew cylinder 100. Preferably, a tandem of the pinch roller 98 and the skew cylinder 100 is disposed proximate the bottom end of the pickets and a second pinch roller and skew cylinder tandem is disclosed proximate the top end of the pickets. Preferably, each pinch roller 98 comprises at least one roller wheel positioned slightly above the picket conveyor 82 proximate where the pickets 32 approach the assembly position 34. Each skew cylinder 100 is operative to move the pinch roller 98 between an engaged position and a disengaged position. In the disengaged position the cylinder 100 is retracted and the pinch roller 98 is positioned above the pickets 32 so that the pickets move along the conveyor 82 solely from friction caused by the weight of the pickets. In the engaged position the cylinder 100 is extended to move the pinch roller 98 to a position where the roller contacts the pickets 32, exerting force onto the pickets and the picket conveyor 82. In operation the skewing assembly 24 will operate to engage only one of the pinch roller 98 and skew cylinder 100 tandems, thereby skewing only that particular end of the picket 32 in question. One skilled in the art will appreciate the pressure from the roller 98 on the pickets 32 and conveyor 82 will cause the particular end of the picket to push harder, to close spacing between the edges of the pickets.

Further with regard to FIG. 2, the nailing system 20 secures pickets 32 to rails 26 at the assembly position 34. The nailing system 20 is preferably comprised of a nail gun 102 and nail supply wheel 106. The nail gun 102 is positioned to dispense nails down through the pickets 32 into the rails 26. The nailing system is replicated each rail support 36 so that each picket 32 is secured to each rail 26. In the preferred embodiment a nail table is used to specify and track the number of nails used at each picket location. The nail table may for example specify 2 nails in each picket and rail for the end pickets, but only 1 nail for center rail pickets; alternatively, alternating nail patterns may also be used.

Turning now to FIG. 3, a back end view along the rail support 36 depicted in FIG. 2 is shown for perspective purposes. As shown in FIG. 3, from the back end 28 of the machine 10 the rail support 36 is shown with the push bar 48 for advancing a rail (obscured by the push bar). The idler sprocket 54 supports the rail conveyor (FIGS. 1 and 1*a*) that advances the push bar 48 and rail 26. The drive sprocket 90 and idler sprocket 86 for the picket conveyor (FIG. 2) are illustrated laterally offset as previously discussed. The centering assembly 50 is further shown, having centering arms 76*a* and 76*b* on opposite sides of the rail 26 and to be actuated by the cylinder 78.

With reference now to FIG. 4, a front end view along the rail support 36 depicted in FIG. 2 is shown for perspective purposes. In FIG. 4, the rail support 36 is shown supporting the rail 26. The rail conveyor 46 is shown in the U-shaped channel of the rail support 36. The conveyor drive sprocket 52 is shown, smaller in diameter when compared to the picket drive sprocket 90. The stop bar 73 is shown in the retracted position, above the picket 32 and rail 26. As discussed above, the cylinder 74 (shown in FIG. 3) is actuated to extend the stop bar 73 to a position to stop the first picket 32 to be secured to the rail 26. The nail gun 102 is shown, positioned to secure the picket 32 to the rail 26. Additionally, the pinch roller 98 of the skew assembly is shown in the disengaged position above the picket 32.

Operation of the machine 10 of the present invention and its various features is the picket preferably automatically controlled by the machine controller 150. One skilled in the art will appreciate the machine controller 150 is operatively connected to operable components of the machine 10. The drive sprockets 52 and 90, the centering assembly cylinder 78, the spacing assembly cylinder 96, the skewing assembly cylinder 100, and the nailing guns 102 will all be connected to and operated by the machine controller 150. Additionally, a plurality of sensors may be disposed to provide operational information to the controller 150. Preferably, a top end position sensor 110 (shown in FIGS. 1 and 2) and a bottom end position sensor 112 (shown in FIGS. 1 and 2) are used to determine and indicate a position of the respective ends of a picket being moved to the assembly position 34. One skilled in the art will recognize that "top end" and "bottom end" may be instead referenced by "left" or "right" to refer to a particular side of the machine 10. The sensors 110 and 112 are preferably optical position sensors, although other types of position sensors are contemplated for use in the present invention. A proximity sensor (not shown) may be used for purposes of identifying when the push bar 48 is positioned to engage a rail 26 and begin the advance of the rail to the assembly position 34. A rotary encoder (not shown) may be used on the drive shaft 56 to know the position of conveyors 46 and 82 and consequently the rails 26 and pickets 32 being advanced to the assembly position 34.

Figure 5:
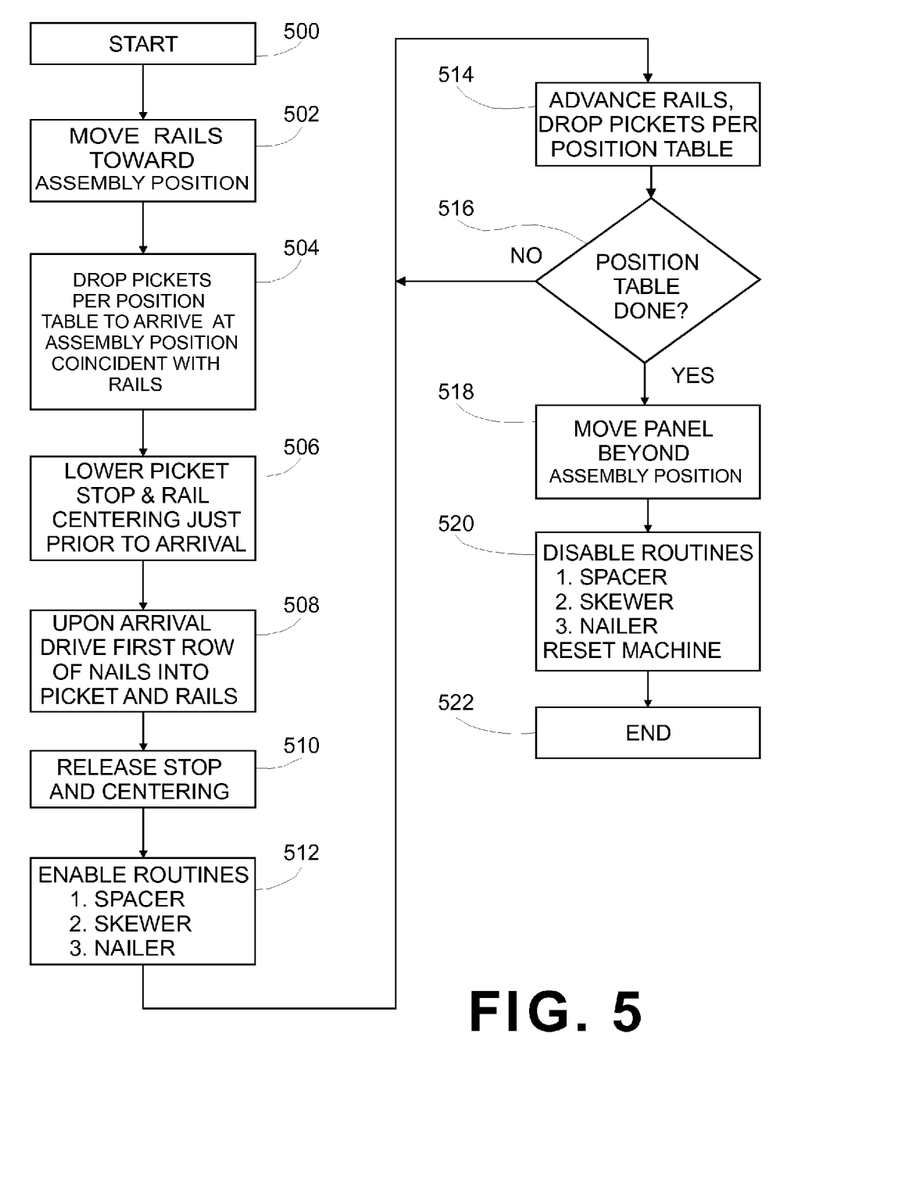
FIG. 5 is a flow chart illustrating logic of the machine controller for the machine of the present invention.

Referring now to FIG. 5, shown therein is a flow chart illustrating logic followed by the machine controller 150 in operating the machine. Operation may be initiated by an operator at 500. At 502, the rail conveyor begins operation and rails are moved toward the assembly position 34. The picket conveyor begins at 504, moving pickets from the hopper 18 to the assembly position 34. At 506 the stop bars 73 are lowered and the rail centering assembly is engaged to align the rails. At 508, when the rails 26 and pickets arrive at the assembly position 34, the nailing system is activated to secure the first picket to the rails. At 510 the stop bars 73 are raised and the centering assembly disengaged. With the conveyors still operative, the rails and pickets will continue to advance along the rail supports. At 512, the controller 150 enables the spacer routine (FIG. 6), the skewer routine (FIG. 7), and the nailer routine (FIG. 8). At 514, the rails are advanced and pickets are moved from the hopper in accordance with distances identified in a position table. The position table is preferably created with preferred positions of pickets on the rails based on average anticipated picket widths. The position table may be defaulted to a standard picket width, or the table may include values based on measured values of a sampling of pickets to be used. At 516 a check is made to see if the position table has been completed, indicating all pickets have been secured to the rails. If the table has not been completed the routine continues at 514. If the table is completed, the panel is moved out of the machine 10 at 518, and the software routines are disabled at 520. The machine's operation completes at 520.

Figure 6:
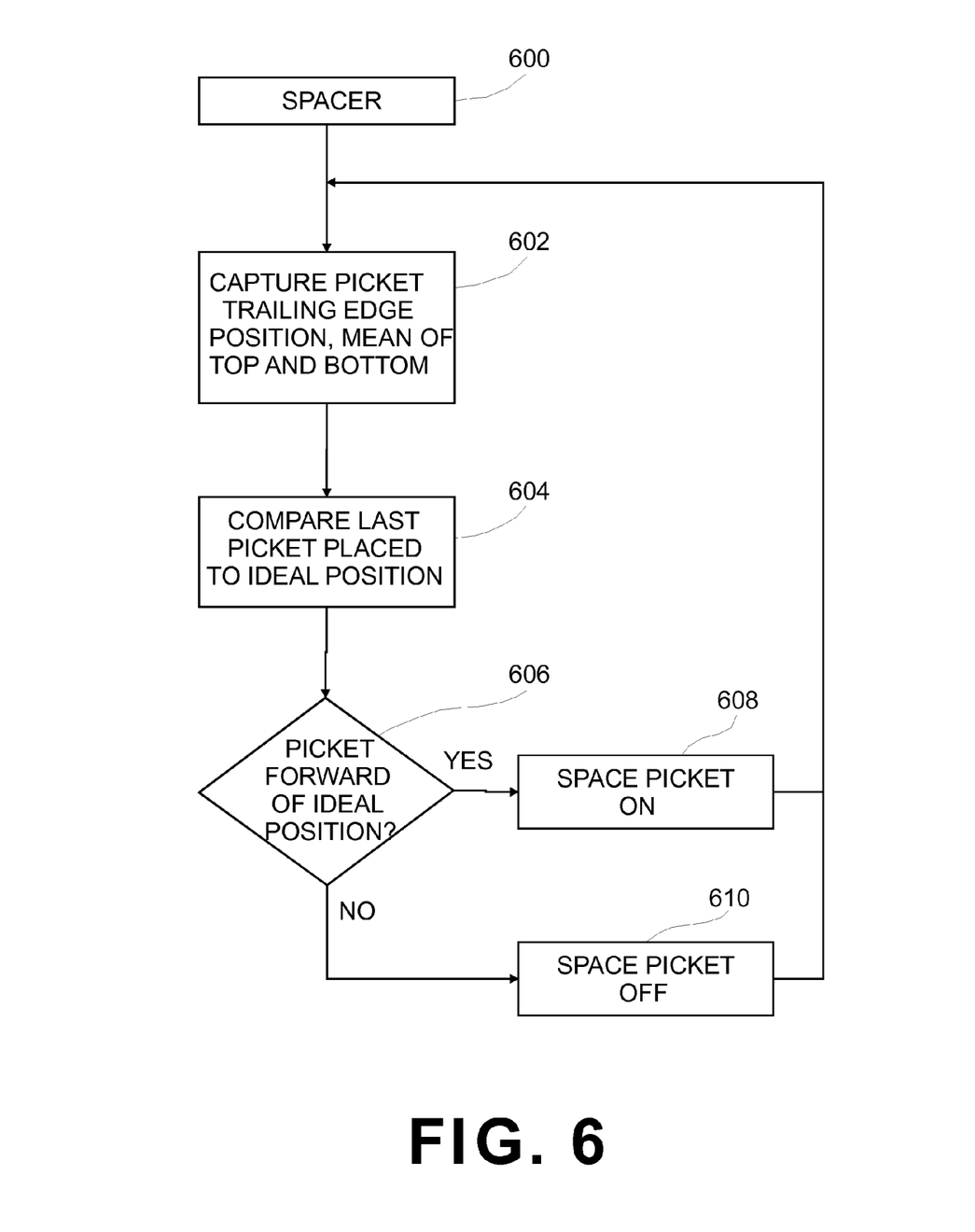
FIG. 6 is a flow chart illustrating logic for the machine controller to adjust spacing between pickets.

Turning now to FIG. 6, there is shown therein the logic flow for the spacer routine beginning at 600. At 602 the position of a picket to be secured to the rails is detected. Preferably, the controller 150 will receive a signal from the sensors 110 and 112 indicative of the location of the trailing edge of the picket. The controller 150 will then average the position data and at 604 compare that position to the anticipated position from the position table. At 606, the controller will determine if the picket is forward of the anticipated position. If the picket is forward, at 608 the controller 150 will engage the spacer assembly cam to add space between pickets. If the picket is behind the ideal position, at 610 the controller will disengage the spacer assembly cam so no additional spacing is created. The spacer routine then loops back for determination of the next picket location.

Figure 7:
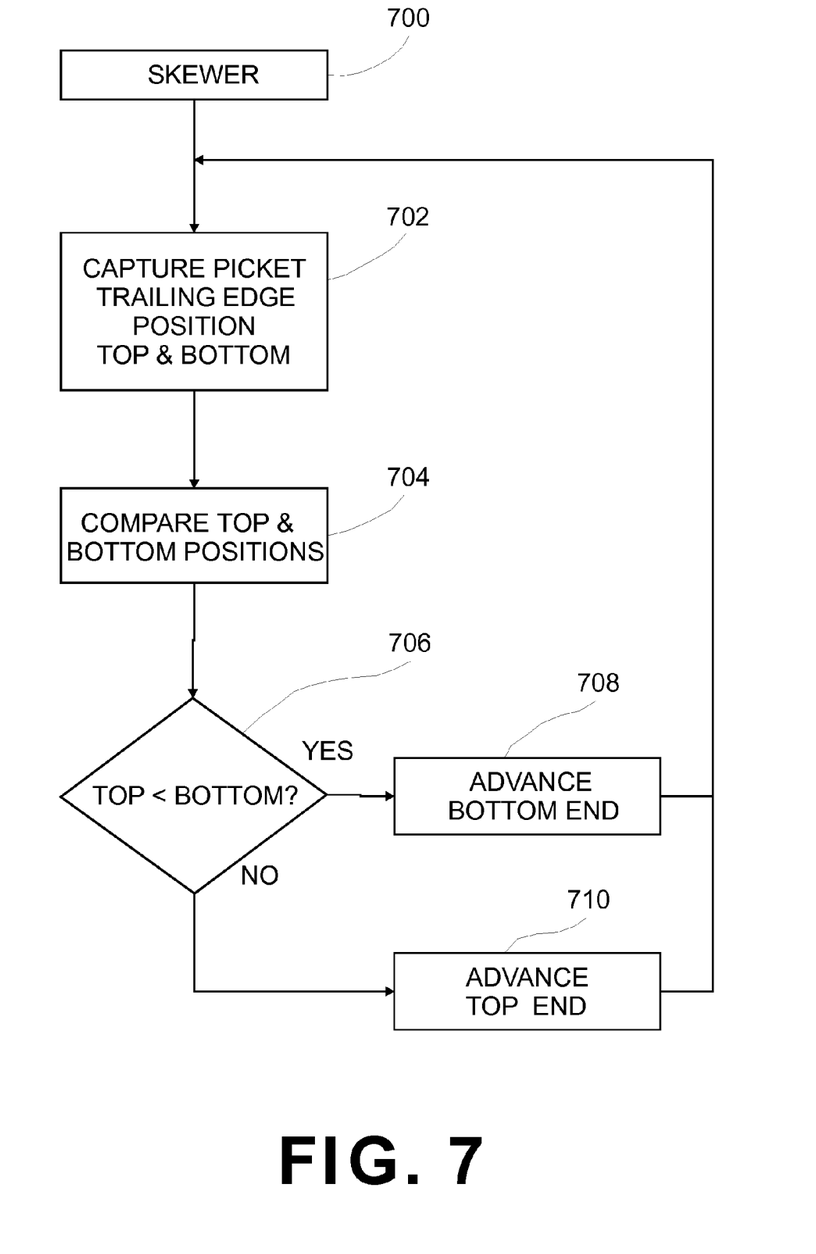
FIG. 7 is a flow chart illustrating logic for the machine controller to skew pickets.
Figure 8:
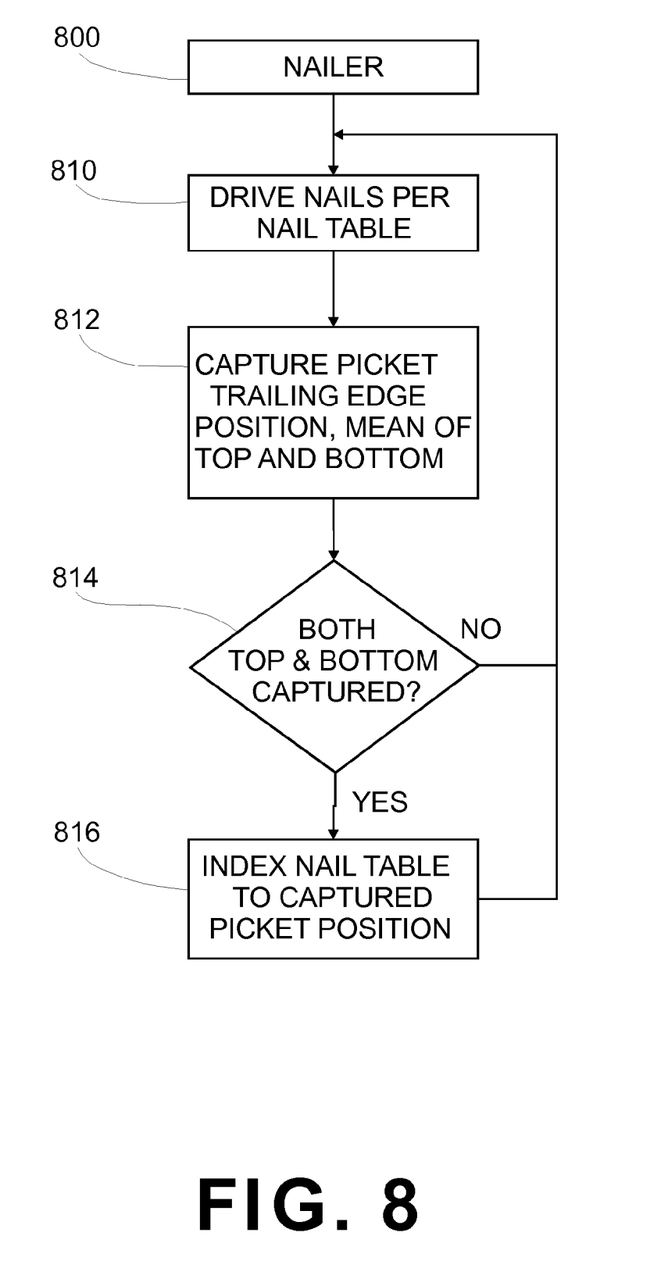
FIG. 8 is a flow chart illustrating logic for controlling the nailing system of the present invention.

With reference now to FIG. 7, the skewer assembly operation routine is illustrated with initiation at 700. At 702 the position of a picket already secured to the rails is detected with the controller 150 receiving a signal from the sensors 110 and 112 indicative of the position of the trailing edge of the picket. At 704 the top end position and bottom end position are compared. If the top end is behind the bottom end at 706, then the controller 150 will engage the skewer assembly top end cylinder at 708 to engage the pinch roller and advance the top end of the picket. If the top end is not behind the bottom end at 706, then the controller 150 will engage the skewer assembly bottom end cylinder at 710 to engage the pinch roller and advance the bottom end of the picket.

Now referring to FIG. 8, the nailing system operation is shown initiated at 800. At 810 the nail guns 102 are operated to drive nails in accordance with values in the nail table. At 812, the controller 150 receives signals from the sensors 110 and 112 to detect the position of the picket to be secured to the rails. At 814 a check is made to determine if both the top and bottom position have been captured, or measured. If both positions are measured (captured) then at 816 the nail table is indexed to the captured picket position, correcting nail placement shift for subsequent picket placements. The nailing routine then loops to 810 where the nail guns 102 are operated to drive the nails. If both positions are not captured at 814, the nailing routine loops to 810 where the nail guns 102 are operated to drive the nails and the nail table is used without correction for shifted pickets.

Various modifications can be made in the design and operation of the present invention without departing from the spirit thereof. Thus, while the principal preferred construction and modes of operation of the invention have been explained in what is now considered to represent its best embodiments, which have been illustrated and described, it should be understood that the invention may be practiced otherwise than as specifically illustrated and described.

What is claimed is:

1. A machine for assembling fence panels, the machine comprising:
   a plurality of rail supports, the plurality of rail supports positioned parallel to each other, each rail support adapted to support at least one rail;
   a plurality of rail transport assemblies, one rail transport assembly disposed for each rail support, each rail transport assembly comprising:
      a rail conveyor, the conveyor adapted to move the at least one rail in a longitudinal direction to an assembly position;
      a push bar secured to each rail conveyor, the push bar adapted to contact the rail in the rail support such that the rail is advanced along the conveyor; the push bar configured to center the rail on the conveyor;
      a centering assembly positioned proximate the assembly position, the centering assembly adapted to position a lead end of the at least one rail on the conveyor at the assembly position, the centering assembly comprising:
         a pair of centering arms movable between an open position and a closed position; wherein in the closed position the centering arms contact the at least one rail on the conveyor such that the rail is positioned at the assembly position; and wherein in the open position the centering arms do not contact the at least one rail on the conveyor;
         a cylinder adapted to move the centering arms between the open position and the closed position;
      a picket hopper adapted to support a plurality of pickets, the picket hopper positioned to support the plurality of pickets substantially perpendicular to the plurality of rail supports, the picket hopper comprising: at least one ledge adapted to support the pickets in the hopper; at least one picket push bar; and a cylinder operatively connected to each picket push bar;

a picket transport assembly adapted to move the pickets from the hopper to the assembly position, the picket transport assembly comprising:
a picket conveyor; and
a conveyor guide positioned at an acute angle to the rail conveyors, the conveyor guide defining a delivery angle for the pickets at the assembly position;

a drive shaft operatively connected to the rail conveyor and the picket conveyor:

a picket spacing assembly comprising:
a spacing guide, the spacing guide movable between an engaged position and a disengaged position; wherein in the engaged position the spacing guide increases the delivery angle for the pickets at the assembly position; and
a second cylinder adapted to move the spacing guide between the engaged position and the disengaged position;

a picket skewing assembly comprising:
a pinch roller, the pinch roller movable between an engaged position and a disengaged position; wherein in the engaged position the pinch roller contacts the pickets proximate the assembly position; and
a skew cylinder adapted to move the pinch roller between the engaged position and the disengaged position; and a nailing system comprising: a plurality of nail guns disposed to secure at least one of the pickets to the at least one rail.

2. The machine of claim 1 further comprising: a top end picket position sensor adapted to detect a position of a first end of the pickets proximate the assembly position and to transmit a left position signal; a bottom end picket position sensor adapted to detect a position of a second end of the picket proximate the assembly position and to transmit a right position signal; a machine controller, the machine controller adapted to: receive the top end position signal and the bottom end position signal; calculate an average picket position; maintain a picket position table; engage the cylinder of the picket spacing assembly; engage the skew cylinder in response to the top end position signal and the bottom end position signal; operate the nailing system in response to a picket positioning signal.

3. A machine for assembling fence panels, the machine comprising:

a plurality of rail supports, the plurality of rail supports positioned parallel to each other, each rail support adapted to support at least one rail;
a plurality of rail conveyors, one rail conveyor disposed for each rail support, each rail conveyor adapted to move the at least one rail in a longitudinal direction to an assembly position;
a picket hopper adapted to support a plurality of pickets substantially perpendicular to the plurality of rail supports;
a picket conveyor adapted to move the pickets from the hopper to the assembly position, the picket conveyor positioned relative to the rail conveyors at a delivery angle;
a picket spacing assembly adapted to adjust the delivery angle of the picket conveyor; and
a plurality of nail guns disposed to secure at least one of the pickets to the at least one rail at the assembly position.

4. The machine of claim 3 further comprising a picket skewing assembly comprising: a pinch roller movable between an engaged position and a disengaged position; wherein in the engaged position the pinch roller contacts the pickets proximate the assembly position; and wherein in the disengaged position the pinch roller does not contact the pickets; and a skew cylinder adapted to move the pinch roller between the engaged position and the disengaged position.

5. The machine of claim 3 further comprising a push bar secured to each rail conveyor, the push bar adapted to contact the at least one rail such that the rail is advanced along the conveyor.

6. The machine of claim 3 further comprising a picket conveyor guide positioned at an acute angle to the rail conveyor, the conveyor guide defining the delivery angle for the pickets at the assembly position; wherein the picket conveyor guide supports the picket conveyor.

7. The machine of claim 6 wherein the picket spacing assembly comprises: a spacing guide, the spacing guide movable between an engaged position and a disengaged position; wherein in the engaged position the spacing guide increases the delivery angle for the pickets at the assembly position; and a cylinder adapted to move the spacing guide between the engaged position and the disengaged position.

8. The machine of claim 3 further comprising: a rail drive sprocket for driving the rail conveyors; a picket drive sprocket for driving the picket conveyor; and a drive shaft operatively connected to the rail drive sprocket and the picket drive sprocket; wherein a diameter of the picket drive sprocket is larger than a diameter of the rail drive sprocket.

\* \* \* \* \*